UNITED STATES PATENT OFFICE.

KISHIRO KANZAKI, OF SUMMIT, NEW JERSEY.

FOOD PRODUCT.

1,220,751. Specification of Letters Patent. Patented Mar. 27, 1917.

No Drawing. Application filed January 10, 1917. Serial No. 141,571.

*To all whom it may concern:*

Be it known that I, KISHIRO KANZAKI, a subject of the Mikado of Japan, and a resident of Summit, in the county of Union and State of New Jersey, have invented a new and Improved Food Product, of which the following is a full, clear, and exact description.

This invention relates to the process of producing a flour and to a flour composition, and has for an object the production of a flour from a natural plant known as awa, grown almost exclusively in Japan.

Another object in view is to produce a flour composition by mixing the flour from the seeds of the awa plant with flour from wheat or rye.

In carrying out the process the seeds from the plant commonly known as awa in Japan are ground, sifted and milled in the usual manner of milling wheat flour. If desired, the awa seeds could be broken up into small particles but not ground, and when so broken up mixed with broken up wheat and used as a breakfast food or, if desired, used alone. When completely milled as flour the same may be used alone as a flour though preferably it is mixed with wheat flour or rye, or some of the other cereals, the preparation being fifty per cent. or more of awa flour and the remaining part of some other grain. The final product of the awa flour mixed with cereals as above described produces a flour composition which will readily receive yeast, baking powders or other ingredients for converting the flour into bread, cake, muffins and the like.

What I claim is:

1. A food product consisting of fresh uncooked comminuted awa grain.
2. A food product consisting of awa flour.
3. A food product consisting of awa flour and a flour from another cereal.
4. A food product consisting of awa flour and wheat flour.
5. A food product consisting of awa flour and wheat flour mixed, the awa flour being at least fifty per cent. of the mixture.
6. A food product consisting of awa flour and wheat flour mixed in such proportion that the wheat flour will be between five and fifty per cent. of the mixture.

KISHIRO KANZAKI.

Copies of this patent may be obtained for five cents each, by addressing the "Commissioner of Patents, Washington, D. C."